US008800002B2

(12) United States Patent
Zill et al.

(10) Patent No.: US 8,800,002 B2
(45) Date of Patent: Aug. 5, 2014

(54) INTER-PROCESS NETWORKING FOR MANY-CORE OPERATING SYSTEMS

(75) Inventors: Brian Don Zill, Bellevue, WA (US); David Garfield Thaler, III, Redmond, WA (US); Parveen K. Patel, Redmond, WA (US); Rebecca Isaacs, Cambridge (GB); Yongguang Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1648 days.

(21) Appl. No.: 12/032,958

(22) Filed: Feb. 18, 2008

(65) Prior Publication Data

US 2009/0210929 A1 Aug. 20, 2009

(51) Int. Cl.
H04L 29/06 (2006.01)
(52) U.S. Cl.
CPC ............ *H04L 63/20* (2013.01); *H04L 63/0227* (2013.01)
USPC .................................. 726/4; 726/12; 709/223
(58) Field of Classification Search
USPC ......................................... 726/4, 12; 709/223
See application file for complete search history.

(56) References Cited

U.S. PATENT DOCUMENTS

| 6,807,582 | B1 * | 10/2004 | Muschenborn ............... 709/252 |
|---|---|---|---|
| 6,996,823 | B1 | 2/2006 | Basso et al. |
| 7,171,492 | B1 * | 1/2007 | Borella et al. ................. 709/245 |
| 2004/0162952 | A1 | 8/2004 | Feind et al. |
| 2005/0010925 | A1 * | 1/2005 | Khawand et al. ............. 719/310 |
| 2006/0136931 | A1 | 6/2006 | Sever et al. |
| 2006/0288209 | A1 | 12/2006 | Vogler |
| 2007/0004501 | A1 | 1/2007 | Brewer et al. |
| 2007/0011272 | A1 | 1/2007 | Bakke et al. |
| 2007/0067771 | A1 | 3/2007 | Kulbak et al. |
| 2007/0073858 | A1 * | 3/2007 | Lakshmi Narayanan et al. .............................. 709/223 |
| 2007/0074011 | A1 | 3/2007 | Borkar et al. |
| 2007/0074192 | A1 | 3/2007 | Geisinger |
| 2007/0113227 | A1 | 5/2007 | Oney et al. |

FOREIGN PATENT DOCUMENTS

WO 2007037006 A1 4/2007

OTHER PUBLICATIONS

Janakiraman, G. John, et al. "Cruz: Application-transparent distributed checkpoint-restart on standard operating systems." Dependable Systems and Networks, 2005. DSN 2005. Proceedings. International Conference on. IEEE, 2005.*
Ross McLlroy, et al. Operating System Support for Asymmetric Multi-Core Architectures. http://www.dcs.gla.ac.uk/~ross/reports/Eurosys07_extended_abstract.pdf. Last accessed Aug. 8, 2007.
Randy Martin. Leveraging Multi-Core Processors with Graphical System Design Tools http://www.embedded.com/columns/showArticle.jhtml?articleID=192501307. Last accessed Aug. 8, 2007.

* cited by examiner

*Primary Examiner* — Vu Le
*Assistant Examiner* — Tracy Mangialaschi
(74) *Attorney, Agent, or Firm* — Stephen A. Wight; Carole Boelitz; Micky Minhas

(57) ABSTRACT

Systems and methods that facilitate inter-process networking are described that can provide inter-process communication, firewall restrictions, process and host mobility, as well as parallelization of task performance. In various embodiments, a computer process can be provided with its own internet protocol address and network stack to facilitate inter-process networking. In further embodiments, a gateway process can facilitate process mobility, host mobility, and parallelization of task performance, as well as management of a host area network by facilitating inter-process communication between suitably configured processes.

17 Claims, 12 Drawing Sheets

INTER-PROCESS NETWORKING FOR MANY-CORE OPERATING SYSTEMS

TECHNICAL FIELD

The subject disclosure relates to computing systems and more particularly to inter-process networking for many-core operating systems.

BACKGROUND

Typically, conventional networking software structure dictates a one host one network stack model. That is, for each instance of a host (e.g., computer, operating system and/or application software), there is exactly one network stack for all operating system and application software processes to communicate with the network. However, the networking software structure in conventional operating systems is ill-equipped to provide advanced features that are possible in future computing systems.

For example, although it is now common for computers to have two or more central processing unit (CPU) cores in even entry-level consumer-grade computers, in the near future, it is anticipated that computers can have many more CPU cores (e.g., thousands of CPU cores). In addition, it is anticipated that operating systems will be structured around virtual machines and hypervisors. Moreover, conventional networking software structures are ill-equipped to respond to increased usage of disaggregated computing (e.g., remote storage and networked devices such as printers) and the increased diversity in network media and applications mobility expected as a result of advances in wireless technologies. Thus, conventional network software structures will be required to service and mediate an increasing number of diverse and competitive processes that simultaneously compete for scarce network resources.

As ever before, security will be a paramount concern while it is anticipated that malware will become increasingly prevalent in virtually every machine. As a result, administrators of enterprise computing systems are expected to have decreasing trust in "internal" machines. This, in turn, will lead to efforts toward moving firewalls into hosts, and more widespread deployment of user-based authentication, for example, as opposed to machine-based authentication.

The above-described deficiencies are merely intended to provide an overview of some of the problems encountered in inter-process networking, and are not intended to be exhaustive. Other problems with the state of the art may become further apparent upon review of the description of the various non-limiting embodiments of the disclosed subject matter that follows.

SUMMARY

In consideration of the above-described deficiencies of the state of the art, the disclosed subject matter provides inter-process networking for many-core operating systems.

In accordance with exemplary non-limiting embodiments, the disclosed subject matter provides systems and methods that facilitate inter-process networking.

Accordingly, in various exemplary embodiments the disclosed subject matter provides systems that facilitate inter-process networking. For example a system that facilitates inter-process networking can include a gateway process configured to manage a host-area network and can facilitate managing the various network devices of the system (e.g., standard network device according to Institute of Electrical and Electronics Engineers, Inc. (IEEE) 802.3 (Ethernet), IEEE 802.11 (Wi-Fi®), IEEE 802.15(Zigbee™), IEEE 802.16 (WiMax™), Ultra-Wide Band (UWB), proprietary network devices, and so on). In addition, a first process having an internet protocol (IP) address and its own network stack can be configured to receive, and accept or reject, inter-process communications from a second process over the host-area network based in part on filtering rules, firewall rules, and/or provision or lack of provision of authentication data, and so on.

In further non-limiting embodiments, the disclosed subject matter provides methodologies that facilitate inter-process communication. For example, a communication such as an inter-process communication can be sent to a computing process at its internet protocol address. If the computing process is determined to be authorized, then the computing process network stack can accept the communication. However, if the computing process is determined to be unauthorized, then the computing process network stack can reject the communication.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the disclosed subject matter in a simplified form as a prelude to the more detailed description of the various embodiments of the disclosed subject matter that follows.

BRIEF DESCRIPTION OF THE DRAWINGS

Inter-process networking for many-core operating systems, and related systems and methods are further described with reference to the accompanying drawings in which.

DETAILED DESCRIPTION

Overview

Figure 1:
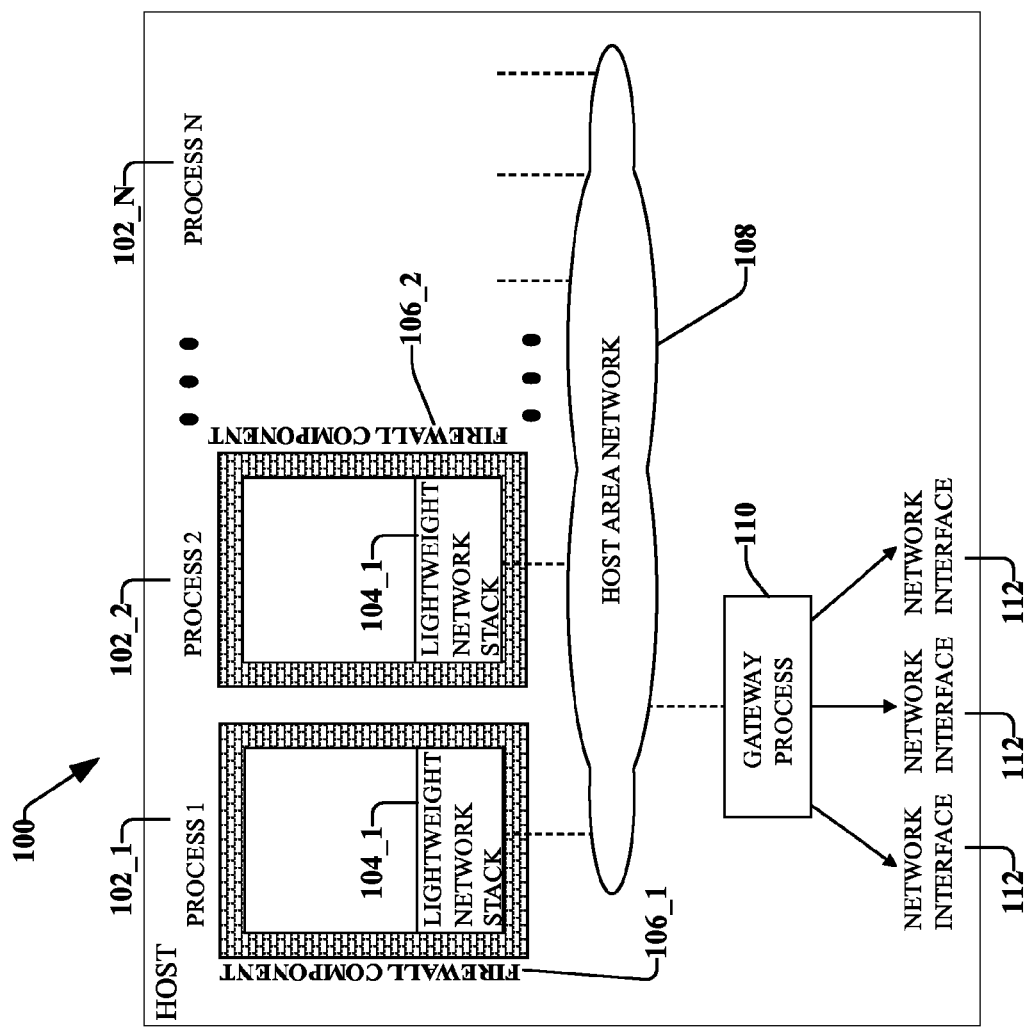
FIG. 1 illustrates an overview of an exemplary host system suitable for incorporation of embodiments of the disclosed subject matter.

Simplified overviews are provided in the present section to help enable a basic or general understanding of various aspects of exemplary, non-limiting embodiments that follow in the more detailed description and the accompanying drawings. This overview section is not intended, however, to be considered extensive or exhaustive. Instead, the sole purpose of the following embodiment overviews is to present some concepts related to some exemplary non-limiting embodiments of the disclosed subject matter in a simplified form as a prelude to the more detailed description of these and various other embodiments of the disclosed subject matter that follow. It is understood that various modifications may be made by one skilled in the relevant art without departing from the scope of the disclosed subject matter. Accordingly, it is the intent to include within the scope of the disclosed subject matter those modifications, substitutions, and variations as may come to those skilled in the art based on the teachings herein.

As used in this application, the term "host" can refer to a computer or a computer-related entity at a specific location on a computer network. Typically, a host can comprise a storage component (e.g., volatile and non-volatile storage and associated software for storage and/or execution of data and/or instructions), a host central processing unit (CPU) (e.g., for controlling the functions of the host according to data and/or instructions), and a communications component (e.g., one or more network devices and associated software for communication with other network components). In addition, a location on a network can be described by an IP address. Thus, in addition to including such computer-related entities as desktop computers, laptop computers, server computers, network attached appliances with computing capability, and so on, the term host can include, for example, a tablet personal computer (PC) device, a Smartphone, and/or a personal digital assistant (PDA), and so on.

Furthermore, as used in this application, the terms "component," "process", "module," "system," and the like are intended to refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

In addition, various embodiments of the disclosed subject matter are directed to methods. It is to be understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The method claims appended hereto present elements of the various steps in a sample order, and are not meant to be limited to the specific order or hierarchy presented.

In consideration of the above-described limitations, in accordance with exemplary non-limiting embodiments, the disclosed subject matter provides systems and methods that facilitate inter-process networking.

Accordingly, in various exemplary embodiments the disclosed subject matter provides systems that facilitate inter-process networking. For example a system that facilitates inter-process networking can include a gateway process configured to manage a host-area network and that can be configured to manage the various network devices of the system (e.g., standard network device according to IEEE 802.3 (Ethernet), IEEE 802.11 (Wi-Fi®), IEEE 802.15 (Zigbee™), IEEE 802.16(WiMax™), Ultra-Wide Band (UWB), proprietary network devices, and so on). In addition, a first process having an IP address and its own network stack can be configured to receive inter-process communications from a second process over the host-area network. Additionally, the first process can be further configured to allow or deny communications inter-process communications from the second process according to one or more of filtering rules, firewall rules, and/or provision or lack of provision of authentication data, and so on.

In further non-limiting embodiments the disclosed subject matter provides methodologies that facilitate inter-process communication. For example, a communication, such as an inter-process communication can be sent to a computing process at its internet protocol address. In addition, a determination can be made by the computing process, whether the communication is authorized. If it is determined that the computing process is authorized, then the computing process network stack can accept the communication. If it is determined that the computing process is unauthorized, then the computing process network stack can reject the communication. As an example, accepting or rejecting the communication can be based on filtering rules, firewall rules, and/or provision or lack of provision of authentication data, and any combination thereof.

Inter-Process Networking for Many-Core Operating Systems

FIG. 1 illustrates an overview of an exemplary host system 100 suitable for incorporation of embodiments of the disclosed subject matter. Host system 100 can comprise a number of components that facilitate inter-process networking according to various aspects of the disclosed subject matter, among other related functions. While various embodiments are described with respect to the components of host system 100 and the further embodiments more fully described below, one having ordinary skill in the art would recognize that various modifications could be made without departing from the spirit of the disclosed subject matter. Thus, it should be understood that the description herein is but one of many embodiments that may be possible while keeping within the scope of the claims appended hereto.

According to various non-limiting embodiments, host system 100 can comprise any number of processes 102 (e.g., process 1 (102_1) . . . process N (process 102_N)) that can facilitate using networking inside the host system 100 for inter-process communications. Accordingly, processes 102 can facilitate providing a unitary view of inter-process and inter-host communication. For example, processes 102 can include application process, file system processes, peripheral component processes (e.g., a printer process), and can be either local to host system 100 or remote therefrom. In various non-limiting embodiments, host system 100 can facilitate utilizing a separate address such as an internet protocol (IP) address for each process, in addition to utilizing networking security mechanisms (e.g., firewalls, filtering rules, etc.) to protect processes from unauthorized inter-process communications.

To that end, processes 102 each can include or be associated with a lightweight network stack 104 to facilitate process mobility, authentication, and network security protection (e.g., firewall protection) at process-level granularity. Advantageously, host system 100 can facilitate providing substantially all of the networking functions to the process-level by including a lightweight network stack for each process. For instance, such networking functions can include firewall functions, network mobility, provision and authentication of authentication credentials, and so on. For example, process 102 can include or be associated with firewall component 106 to facilitate regulating flow of network traffic between and among processes 102. As a further example, firewall component 106 can facilitate inspecting network traffic passing through it as well as denial and/or permitting passage of such network traffic based on a set of rules. Moreover, host system 100 can provide convenience and engineering efficiency to a network implementation by including substantially the same mechanism for both inter-process and inter-host communications.

According to various non-limiting embodiments, host system 100 can facilitate inter-process communication between and among processes 102 by forming a network referred to as a host area network 108 (HAN). The disclosed subject matter, in one aspect thereof, can include a HAN 108 that facilitates using internet protocols over a shared memory. The process network stack is referred to as a lightweight network stack 104 because, in one aspect of the disclosed subject matter, the network stack 104 (e.g., at a device level) facilitates supporting a HAN interface (e.g., rather than any arbitrary network device such as arbitrary Ethernet cards wireless network cards).

In addition, host system 100 can include a gateway process 110, according to further non-limiting embodiments of the disclosed subject matter. In one aspect, gateway process 110 can include a full network stack and can facilitate managing inter-process networking over HAN 108. In a further aspect of the disclosed subject matter, gateway process 110 can facilitate managing networking devices included or associated with host system 100 (e.g., network interfaces 112, such as standard network device according to Institute of Electrical and Electronics Engineers, Inc. (IEEE) 802.3 (Ethernet), IEEE 802.11 (Wi-Fi®), IEEE 802.15 (Zigbee®), IEEE 802.16 (WiMax™), Ultra-Wide Band (UWB), proprietary network devices, and so on) and network media diversity (e.g., wired and wireless media types), and to facilitate bridging with external networks (e.g., such as for inter-host communications).

Advantageously, host system 100 system having a lightweight network stack 104 per process 102 can facilitate efficiently utilizing multiple host system processor cores, as well as utilizing network security mechanisms such as firewalls and filtering rules (e.g., for inter-process protection). For example, for communication within host system 100 between processes 102 inside the host, host system 100 can facilitate providing process isolation and process protection between processes 102. For the purposes of illustration and not limitation, host system 100 can include a system firewall (not shown) that can, for example, indicate what ports and IP addresses are open, and so on, to facilitate isolation and protection of processes 102 from other processes (e.g., either external or internal to host system 100).

According to a further example, processes 102 running within host system 100 can be restricted according to what processes can be allowed to communicate with processes 102. For example, firewall component 106 can be configured to facilitate inter-process communication restrictions, such that processes running as process 102_1 can be allowed to communicate with processes running as process 102_2, but communication with processes running as process 102_N can be disallowed. Thus, host system 100 can advantageously facilitate providing two independent mechanisms for process isolation and protection rather than a common security strike point, according to various aspects of the disclosed subject matter. According to further aspects, the mechanisms can be unified (e.g., a single firewall used to protect against inside versus outside threats) while facilitating process mobility.

Accordingly, host system 100 can advantageously facilitate process mobility, such as for moving a process from one host to another (e.g., either between and among virtual, real, and/or any combination thereof), while being able to keep the same connection regardless of what host the process is currently executing on. For example, host system 100 can facilitate native load balancing and/or failure protection by failover to other processes and/or hosts (e.g., operating in the HAN 108 or in the external network). As a further example, consider a number of processes 102, executing on a number of host systems 100 and serving various functions. As a result of a momentary change in demand or supply of a particular critical function (e.g., due to increased server demand due to flash crowds, decreased supply due to failures and/or planned downtimes, etc.), host system 100 can facilitate transitioning processes 102 around among physical resources (e.g., another host system 100 or otherwise).

Thus, for purposes of illustration and not limitation, each process 102 can be described as a tiny version of a virtual host, that can include or be associated with its own lightweight network stack 104, IP address, and network connectivity to the network. Accordingly, host system 100 facilitates moving each process 102 or virtual host (e.g., process 102 and lightweight network stack 104) as a pair. As a result, such movement of the process 102 and lightweight network stack 104 pair can facilitate transparently maintaining the appearance to outside processes in communication with the virtual host (e.g., process 102 and lightweight network stack 104) of process 102 movement within the network. For example, a route page for the process 102 and lightweight network stack 104 pair can show that the virtual host has moved from one subnet to another subnet while retaining the same IP address, residing on the same router, and so on.

It is to be appreciated that the various functions, components, or process steps can be combined or distributed via techniques known in the art or can be eliminated or reorganized according to system design considerations without departing from the scope of the claims appended hereto. For example, while the functions of lightweight network stack 104, firewall component 106, and gateway process 110 are depicted as occurring in discrete blocks for purposes of illustration, it should be understood that such functions can be combined or distributed as desired. As a further example, system design considerations may dictate the elimination, optimization, or integration of such functions or portions thereof. Furthermore, some or all of functions described can be combined, integrated, and/or distributed as the system design considerations dictate. Further examples of such modifications will become apparent to those skilled in the art upon review of the various embodiments disclosed and claimed herein.

Lightweight Network Stack

Figure 2:
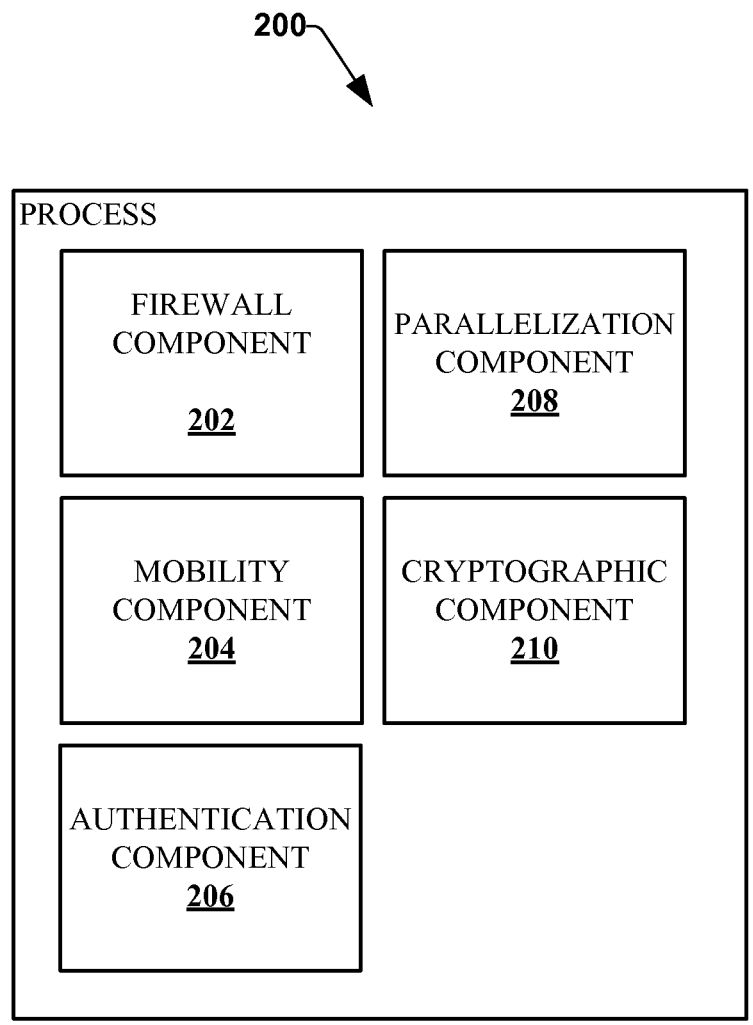
FIG. 2 illustrates an exemplary non-limiting block diagram of a computing process that facilitates inter-process networking according to various embodiments of the disclosed subject matter.

FIG. 2 illustrates an exemplary non-limiting block diagram of a computing process 200 that facilitates inter-process networking according to various embodiments of the disclosed subject matter. As briefly described above with reference to FIG. 1, various non-limiting embodiments of the disclosed subject matter can include a lightweight network stack 104. It is to be appreciated that lightweight network stack 104 can include its respective functionality, as more fully described herein, for example, with regard to host system 100.

As described above, a network stack can be associated with each process 102 to facilitate inter-process networking. Because processes 102 are attached to a virtual link (e.g., HAN 108), processes 102 can be configured to support one interface (e.g., interfaces to other processes 102). As a result, drastic simplifications over a general-purpose network stack are possible while facilitating inter-process networking. Thus, relative to general-purpose network stack, the process network stack of the disclosed subject matter can be referred to as a lightweight network stack. For example, processes 102 can have one interface and one set of IP addresses on that interface (e.g., rather than supporting arbitrary network interfaces), which, in one aspect, can be a hard-coded interface of the same type among processes 102. In a further aspect, the disclosed subject matter can facilitate choosing a different network stack for a process 102 based on, for example, application requirements. For example, a multi-threaded process can use a multi-threaded network stack. As a further example, a file system process can use a different network stack than an application process network stack.

In addition, processes 102 running in the same host system 100 can advantageously facilitate resource sharing between the processes 102. For instance, typical virtual machines have code and data replicated and loaded multiple times into the same physical memory (e.g., using different address spaces). In contrast, various non-limiting embodiments of the disclosed subject matter can facilitate resource sharing and communicating between processes running on the same physical machine. As an illustration, it can be appreciated that it can be much more efficient to communicate between process 102_1 and process 102_2 across a host area network 108 via the respective lightweight network stacks 104_1 and 104_2, rather than communicating through the full network stack, (e.g., down through the virtual local area network (LAN), across the virtual LAN, and back up the full network stack). Thus, the disclosed subject matter, in various embodiments thereof, facilitates efficient communication across virtual hosts (e.g., the process 102 lightweight network stack pair 104) not achievable using full general-purpose network stacks.

Accordingly, computing process 200 can include various components that facilitate a lightweight network stack functionality. For example, process 200 can include a firewall component 202 to facilitate firewall capability at the boundary of each process 200. As a result, process 200 can facilitate setting fine-grained access control, for example, to allow communications from a trusted process and deny them from unknown (e.g., malware) processes.

In addition, process 200 can include a mobility component 204 to facilitate process mobility. For example, process mobility provided by the lightweight network stack 104 can facilitate processes 200 changing their point-of-attachment to the HAN 108 or connected host systems 100 without changing their IP address. Thus, mobility component 204 can be configured to facilitate such process mobility (e.g., such as by Internet Engineering Task Force (IETF) standard communications protocol Mobile IP). As a result, mobility component 204 can facilitate a single communication mechanism with a consistent address to support process mobility (e.g., migration between virtual hosts, between hosts systems 100 in a cluster, between any two hosts systems 100 over the Internet, and so on).

For the purpose of illustration and not limitation, consider a user running a Live™-enabled application on one host system 100. After the user is done using the host system 100, the user can suspend the application, the state of which can be saved (e.g., in a network of cloud servers). Thereafter, the user can log in to another host system and can download and resume the application from the state saved from the host system 100. According to an aspect of the disclosed subject matter, communications process mobility can be provided by a lightweight network stack 104, for example, embedded in the process itself.

Additionally, process 200 can include an authentication component 206 to facilitate authentication on a per process basis. For example, the process authentication capability facilitated by an authentication component 206 in a lightweight network stack 104 at each process, can provide per-user or per-process credentials, and verification thereof (e.g., rather than only have per host credentials in a one host one network stack model).

Thus, authentication component 206 can solicit authentication data from and/or provide authentication data to an entity (e.g., a process 200, a user, a device, a component, and/or a subcomponent, and so on) or another object (e.g., an operating system and/or other application software) on behalf of an entity, and, upon receiving the proper authentication data so solicited, can be employed, individually and/or in conjunction with information acquired and ascertained as a result of biometric modalities employed, to facilitate authentication of the entity to permit, limit, and/or restrict access to process 200.

For example, authentication component 206 can facilitate authenticating an entity based on information provided (e.g., from a host system 100, from another process 102, and/or via a proxy and/or a trusted third party, and so on). For instance, authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a shared secret such as a pass code (e.g., Personal Identification Number (PIN)), and the like, for example. Additionally and/or alternatively, public key infrastructure (PKI) data can also be employed by authentication component 206. PKI arrangements can provide for trusted third parties to vet, and affirm, entity identity through the use of public keys that typically can be certificates issued by trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 206 can implement one or more machine-implemented techniques to identify an entity (e.g., a process 200, a user, a device, a component, and/or a subcomponent, and so on) or another object (e.g., an operating system and/or other application software) on behalf of an entity, by an entity's unique physical characteristics (e.g., MAC address, hash string, and so on) and/or behavioral characteristics and attributes. For example, in the case of user authentication, biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

According to further non-limiting embodiments, process 200 can include a parallelization component 208 to facilitate parallel processing. As described above, the disclosed subject matter can facilitate choosing a different network stack for a process 102 based on, for example, application requirements. For example, to facilitate parallel processing, process 200, in the form of a multi-threaded process can use a multi-threaded network stack. Accordingly, a lightweight network stack 104 at each process 102 can be designed and configured to include parallelization component 208 to facilitate highly parallelized processing. As a result, various non-limiting embodiments of the disclosed subject can efficiently utilize many-core architectures for parallel processing.

In an exemplary non-limiting embodiment, a lightweight network stack 104 associated with process 200, or portions thereof, can be configured to run in a different core of a many-core architecture, from user code of the process 200. As a result, simultaneous incoming and outgoing packets can traverse the lightweight network stack 104 in parallel in different cores. As further described below, regarding FIG. 3, gateway process 110 can additionally facilitate parallel network processing by managing network devices 112 and providing such functions as bridging, routing, and/or gateway functions.

In addition, in further non-limiting embodiments of the disclosed subject matter, process 200 can include a cryptographic component 210 to provide secure inter-process network functions (e.g., inter-process communication, process mobility, etc.). In accordance with an aspect of the disclosed subject matter, cryptographic component 210 can provide symmetric cryptographic tools and accelerators (e.g., Twofish, Blowfish, AES, TDES, IDEA, CAST5, RC4, etc.) to facilitate encrypting and/or decrypting data. Thus, cryptographic component 210 can facilitate securing data being communicated to a process 200, stored via a process 102 such as a file system process, and/or read from a process 102 such as via a network file storage process, transmitted to or received from a HAN 108 or external network connected processes, and/or creating a secure communication channel as part of a secure association between hosts and/or processes with an entity (e.g., a process 200, a user, a device, a component, and/or a subcomponent, and so on) or another object (e.g., an operating system and/or other application software) on behalf of an entity to facilitate protecting data and/or instructions to restrict access to those entities authorized and/or authenticated to do so.

For example, to facilitate secure file storage via a network file system process, the disclosed subject matter, in one aspect thereof, can facilitate encrypting and/or decrypting data and/or instructions to limit access to those authorized and/or trusted entities. To the same ends, cryptographic component 210 can also provide asymmetric cryptographic accelerators and tools (e.g., RSA, Digital Signature Standard (DSS), and the like) in addition to accelerators and tools (e.g., Secure Hash Algorithm (SHA) and its variants such as, for example, SHA-0, SHA-1, SHA-224, SHA-256, SHA-384, and SHA-512).

Gateway Process

Figure 3:
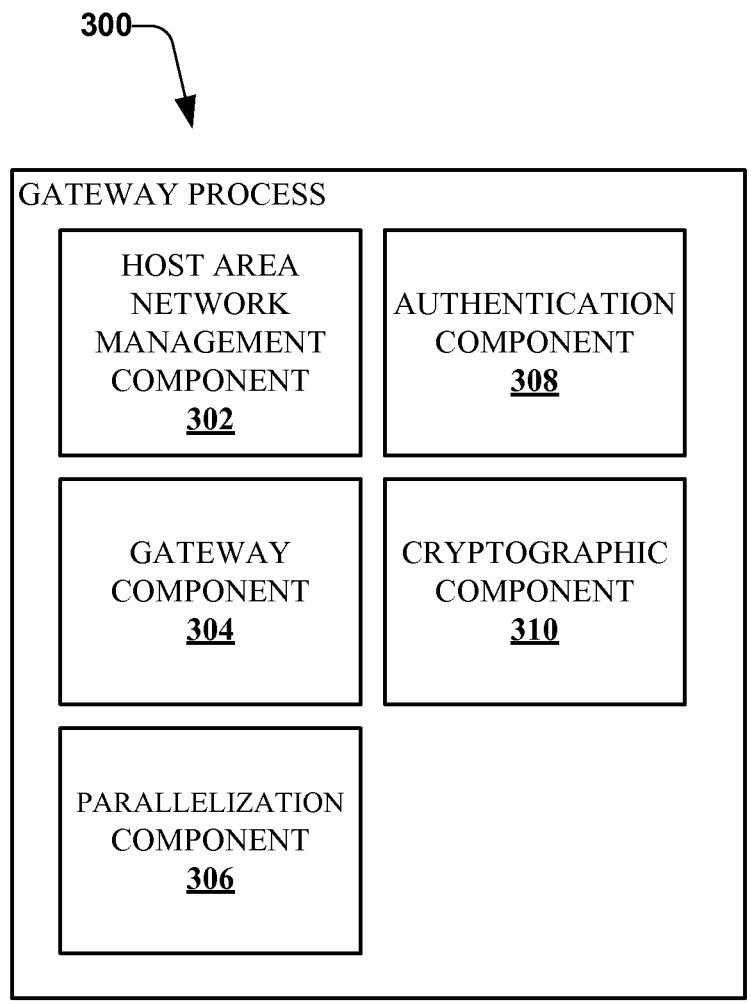
FIG. 3 illustrates an exemplary non-limiting block diagram of a gateway process that facilitates inter-process networking according to various embodiments of the disclosed subject matter.

FIG. 3 illustrates an exemplary non-limiting block diagram of a gateway process 300 that facilitates inter-process networking according to various embodiments of the disclosed subject matter. As briefly described above with reference to FIG. 1, various non-limiting embodiments of the disclosed subject matter can include a gateway process 110. It is to be appreciated that gateway process 110 can include its respective functionality, as more fully described herein, for example, with regard to host system 100. In addition, while gateway process 110 or 300 is described as a process, it is to be further appreciated that some or all of the functionality described can be provided as a whole, or in part, by software, hardware or any combination thereof. Accordingly, the terms "gateway process," "gateway," and the particular embodiments thereof (e.g., gateway, router, switch, network address translation (NAT) box, bridge) are intended to refer to a computer-related entity, either hardware, firmware, a combination of hardware and software, software, software in execution, firmware, middle ware, microcode, and/or any combination thereof.

As described above, a gateway process 300 can include a full network stack and can facilitate managing inter-process networking over HAN 108. In addition, gateway process 300 can facilitate managing networking devices included or associated with host system 100 (e.g., network interfaces 112, such as standard network device according to IEEE 802.3 (Ethernet), IEEE 802.11 (Wi-Fi®), IEEE 802.15 (Zigbee™), IEEE 802.16 (WiMax™), Ultra-Wide Band (UWB), proprietary network devices, and so on) and network media diversity (e.g., wired and wireless media types), and facilitate bridging with external networks (e.g., such as for inter-host communications).

Accordingly, gateway process 300 can include various components that facilitate inter-process networking. In exemplary non-limiting embodiments of the disclosed subject matter, gateway process 300 can include HAN management component 302 to facilitate establishing HAN 108 and managing inter-process communication over HAN 108. For example, according to various embodiments, process 102_1 can communicate directly with process 102_2. However, in further non-limiting embodiments gateway process 300 can facilitate process mobility, for example, between host systems (e.g., host systems 100).

In addition, gateway process 300 can include gateway component 304 to facilitate managing networking devices included or associated with host system 100 (e.g., network interfaces 112 as described above) and network media diversity (e.g., wired and wireless media types), and to facilitate bridging with external networks. For example, gateway component 304 can facilitate linking the virtual link (e.g., HAN 108) via a host system 100 real link (e.g., network devices 112) to network components external to host system 100. As a result, for the purpose of illustration and not limitation, gateway component 304 can be described as bridging between a virtual link to the real link, similar to a network bridge.

It should be further appreciated that, depending on the context or system design requirements, the mechanism used in a gateway component 304 between HANs 108 can facilitate different and/or complementary functions. Basic functionality of gateway component 304 facilitates interconnecting between processes 102 and connecting with network components external to host system 100 (e.g., another host, a networked resource such as a printer or storage component, etc.)

For example, although the above description refers to bridge functionality, in various non-limiting embodiments, gateway component 304 can provide functionality (or a subset thereof) of a NAT box, a switch, a router, and/or anything that would naturally be used to connect one LAN to another LAN (e.g., wired and/or wireless or any combination thereof), and any combination thereof. It should be appreciated that the selection of which analog can result in slightly different implementation scenarios of the disclosed subject matter depending on context and system design considerations.

As a further example, the choice of which functionalities are selected can depend in part on what protocol support is desired (e.g., to facilitate process mobility between the host systems 100). For instance, if the choice for gateway process functionality is that functionality typically provided by a router, then it should be understood that a HAN 108 of one host system and the HAN 108 of a different host system would typically reside on different subnets, even if the two machines are adjacent to each other. As a result of a process 102 moving from one host system to the other, the IP address of process 102 would change from one host system in the network to another in the network. Accordingly, gateway process 300 can be configured to implement IETF mobile IP, for example, to facilitate such a scenario.

Alternatively, if the choice for gateway process functionality is that functionality typically provided by a bridge to connect HAN 108 to the physical LAN connection (e.g., network devices 112), then 300 can be configured to utilize mobile link layer protocols to facilitate MAC addresses moving from one switchboard to another switchboard.

According to further non-limiting embodiments, gateway process 300 can include parallelization component 306 that facilitates inter-process networking. For example, in addition to within-host parallelization for a many-core host system 100, parallelization component 306 can facilitate parallel network processing by managing network devices 112 and providing such functions as bridging, routing, and/or gateway functions as described for inter-host communications in support of parallel processing.

According to further non-limiting embodiments, gateway process 300 can include authentication component 308 that can provide process authentication capability, whether for the purpose of authentication by gateway process 300, host system 100, a process thereof (e.g., process 102), or otherwise. For example, authentication component 308 can solicit authentication data from and/or provide authentication data to an entity (e.g., a process 102 and/or 200, a user, a device, a component, and/or a subcomponent, and so on) or another object (e.g., an operating system and/or other application software) on behalf of an entity, and, upon receiving the proper authentication data so solicited, can be employed, individually and/or in conjunction with information acquired and ascertained as a result of biometric modalities employed, to facilitate authentication of the entity to permit, limit, and/or restrict access to process 200.

For example, authentication component 308 can facilitate authenticating an entity based on information provided (e.g., from a host system 100, from a process 102, and/or via a proxy and/or a trusted third party, and so on). For instance, authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a shared secret such as a pass code (e.g., Personal Identification Number (PIN)), and the like, for example. Additionally and/or alternatively, public key infrastructure (PKI) data can also be employed by authentication component 308. PKI arrangements can provide for trusted third parties to vet, and affirm, entity identity through the use of public keys that typically can be certificates issued by trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 308 can implement one or more machine-implemented techniques to identify an entity (e.g., a process 102 and/or 200, a user, a device, a component, and/or a subcomponent, and so on) or another object (e.g., an operating system and/or other application software) on behalf of an entity, by an entity's unique physical characteristics (e.g., MAC address, hash string, digital signature, and so on) and/or behavioral characteristics and attributes. For example, in the case of user authentication, biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

According to further non-limiting embodiments of the disclosed subject matter, gateway process 300 can include cryptographic component 310 to facilitate secure inter-process network functions (e.g., inter-process communication, process mobility, etc.). In accordance with an aspect of the disclosed subject matter, cryptographic component 310 can provide symmetric cryptographic tools and accelerators (e.g., Twofish, Blowfish, AES, TDES, IDEA, CAST5, RC4, etc.) to facilitate encrypting and/or decrypting data, whether for the purpose of encrypting and/or decrypting by gateway process 300, host system 100, a process thereof (e.g., process 102), or otherwise. Thus, cryptographic component 310 can facilitate securing data being communicated to a process 200, stored via a process 102 such as a file system process, and/or read from a process 102 such as via a network file storage process, transmitted to or received from a HAN 108 or external network connected processes, and/or creating a secure communication channel as part of a secure association between hosts and/or processes with an entity (e.g., a process 102 and/or 200, a user, a device, a component, and/or a subcomponent, and so on) or another object (e.g., an operating system and/or other application software) on behalf of an entity to facilitate protecting data and/or instructions to restrict access to those entities authorized and/or authenticated to do so.

For example, to facilitate secure file storage via a network file system process, the disclosed subject matter, in one aspect thereof, can facilitate encrypting and/or decrypting data and/or instructions to limit access to those authorized and/or trusted entities. To the same ends, cryptographic component 310 can also provide asymmetric cryptographic accelerators and tools (e.g., RSA, Digital Signature Standard (DSS), and the like) in addition to accelerators and tools (e.g., Secure Hash Algorithm (SHA) and its variants such as, for example, SHA-0, SHA-1, SHA-224, SHA-256, SHA-384, and SHA-512).

Figure 4:
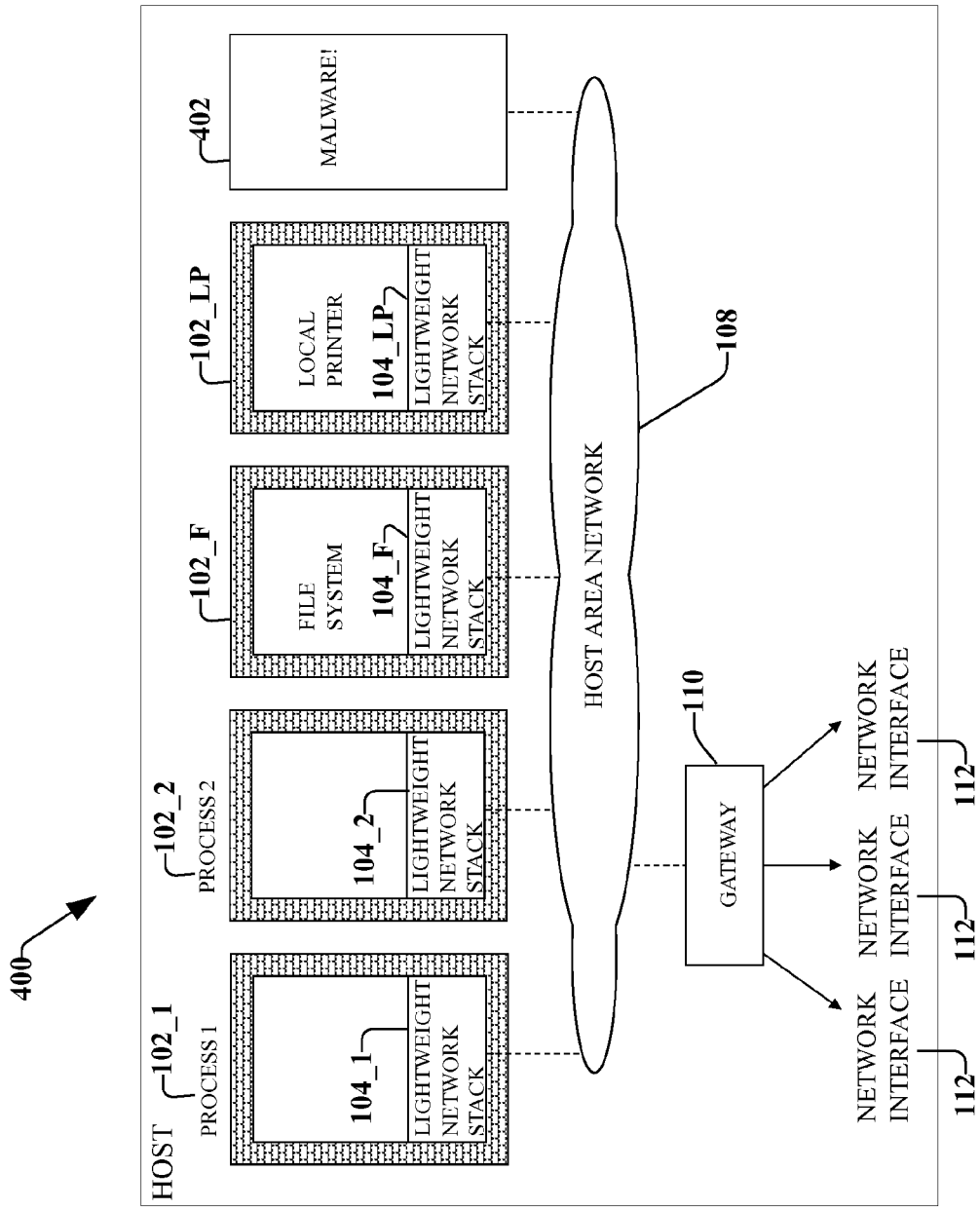
FIG. 4 illustrates an exemplary non-limiting block diagram of a host system that facilitates inter-process networking according to various aspects of the disclosed subject matter.
Figure 5:
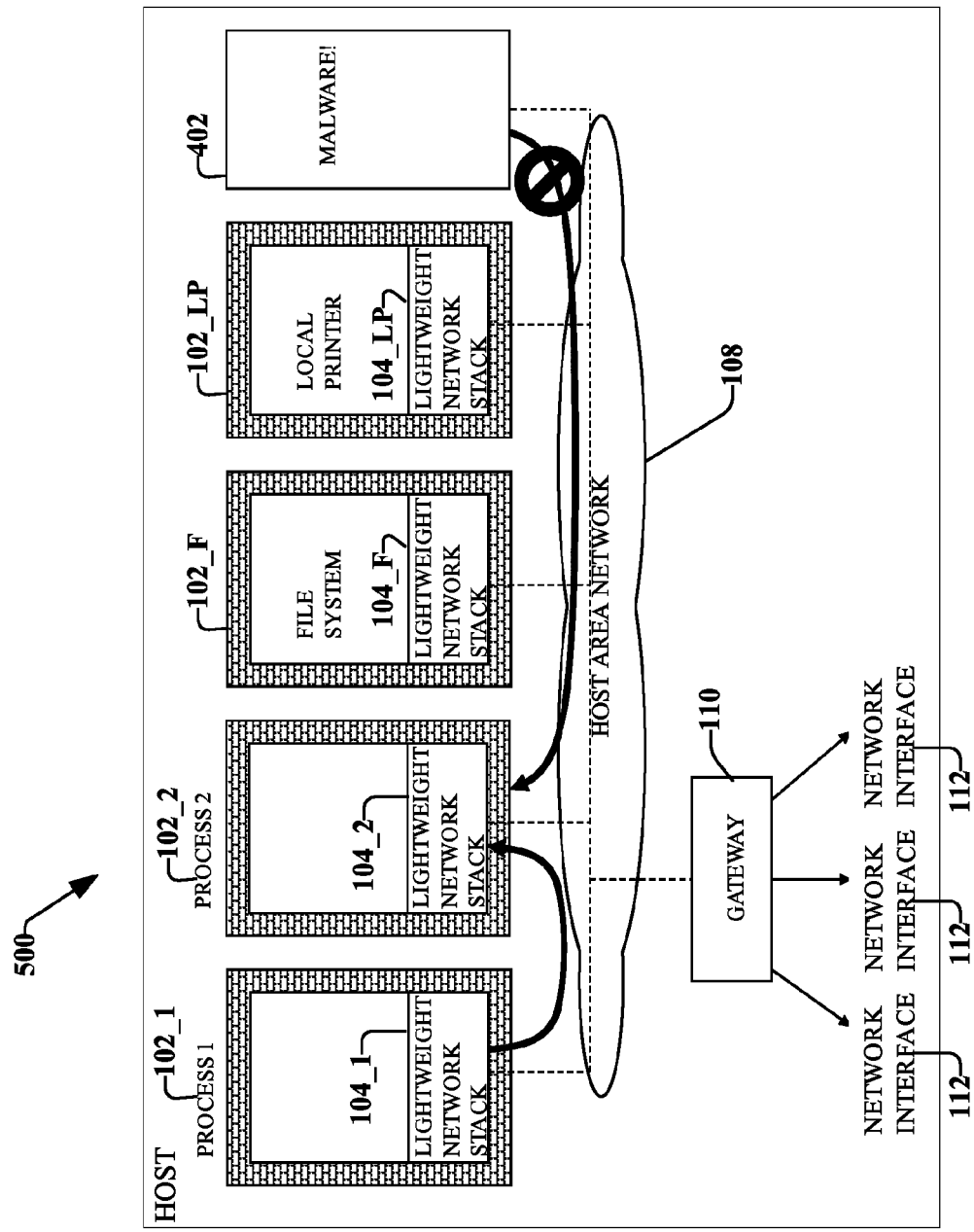
FIG. 5 depicts an exemplary non-limiting block diagram of a host system that facilitates various aspects of the disclosed subject matter.

FIGS. 4 and 5 illustrate exemplary non-limiting block diagrams of host systems 400 and 500 that facilitate inter-process networking according to various aspects of the disclosed subject matter. As described above with reference to FIGS. 1-3, in various non-limiting embodiments of the disclosed subject matter, host system 400 and 500 can comprise a host system (e.g., host system 100), including a number of processes 102, each associated with a lightweight network stack 104, and connected via a HAN 108. In addition, host systems 400 and 500 can include gateway 110 (e.g., gateway process 110) and network interfaces 112.

It is to be appreciated that processes 102, lightweight network stack 104, HAN 108, gateway 110, and network interfaces 112 can each include their respective functionality, as more fully described herein, for example, with regard to host system 100, process 200, and/or gateway process 300. In addition, host systems 400 and 500 can include local file system 102_F and local printer 102_LP, each configured according to various aspects of the disclosed subject matter to facilitate inter-process networking. Advantageously, gateway process 110 can also be configured to block such communications, for example, across HAN 108 to network interfaces 112. For example, gateway process 110 can be configured to require authentication from processes (e.g. processes 102), and upon failing such a requirement (e.g., as malware 402 would be expected to fail), gateway process 110 can facilitate blocking any such traffic from the requesting process. As a result, any malware infection can be mitigated by restricting its proliferation to the local host (e.g., host system 400 or 500).

As described above, malware (e.g., adware, spyware, browser hijacking software, worms, viruses, Trojans, rootkits, and so on) are expected to be increasingly prevalent in host systems. Thus, as ever before, security will be of paramount importance. Accordingly, host system 500 depicts malware 402 attempting to communicate with processes 102. Advantageously, a process 102_2, with firewall capability and configured according to various aspects of the disclosed subject matter, can facilitate setting fine-grained access control. For example, host system 500 illustrates that process 102_2, or portions thereof, as well as other similarly configured processes 102, can facilitate allowing communications from a trusted process (e.g., other processes 102 such as 102_1, 102_F, and so on), and denying communications from and unknown (e.g., malware 402) processes.

Figure 6:
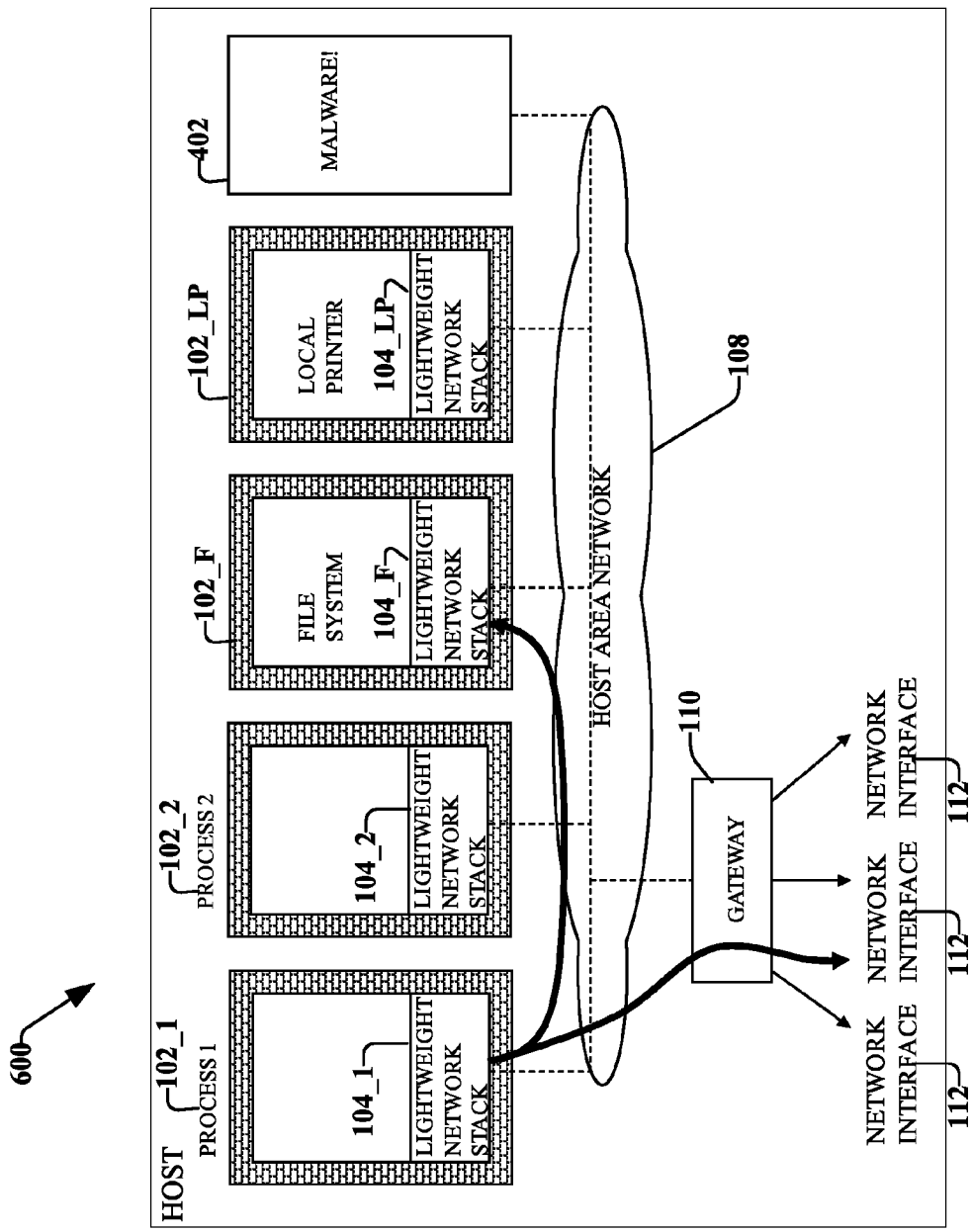
FIG. 6 depicts a non-limiting block diagram of a host system according to further aspects of the disclosed subject matter.

FIG. 6 depicts a non-limiting block diagram of a host system 600 according to further aspects of the disclosed subject matter. As described above with reference to FIGS. 1-5, in various non-limiting embodiments of the disclosed subject matter, host system 600 can comprise a host system (e.g., host system 100), including a number of processes 102 (e.g., including local file system 102_F and local printer 102_LP), each associated with a lightweight network stack 104, and connected via HAN 108. In addition, host system 600 can include gateway 110 (e.g., gateway process 110) and network interfaces 112. It is to be appreciated that processes 102 lightweight network stack 104, HAN 108, gateway 110, and network interfaces 112 can each include their respective functionality, as more fully described herein, for example, with regard to host system 100, process 200, gateway process 300, and/or host systems 400 and 500.

In various non-limiting embodiments, the disclosed subject matter facilitates treating inter-process networking with local resources the same as inter-process networking with remote resources (not shown) (e.g., across gateway 110). Accordingly, host system 600 can facilitate treating the local file system process 102_F (as well as local peripheral resources such as local printer 102_LP) in the same manner as a remote file system process (not shown).

Advantageously, by treating such resources agnostically, various embodiments of the disclosed subject matter can natively support load balancing and failover functions. For example, according to an aspect, the disclosed subject matter can facilitate configuring process 102_1 to have no preference for local file system process 102_F versus a remote file system process (not shown). Thus, if local file system process 102_F is busy responding to other tasks, process 102_1 can be configured to seek out available remote file system processes (not shown). According to a further aspect, the disclosed subject matter can facilitate configuring process 102_1 to have preferences of varying degree for local processes (e.g., local file system process 102_F) versus remote processes (e.g., a remote file system process (not shown)). For example, a highly sensitive and/or critical process might strictly desire local system storage by local file system process 102_F, whereas a general documents back up process can desire less strict preferences.

As a further advantage, treating such resources agnostically further supports network-level and/or host-level parallelization. For example, rather than waiting for a local file system process 102_F to finish, a process 102 executing in parallel with another process on another host (not shown) can seek out suitable alternative file system processes (not shown).

Figure 7:
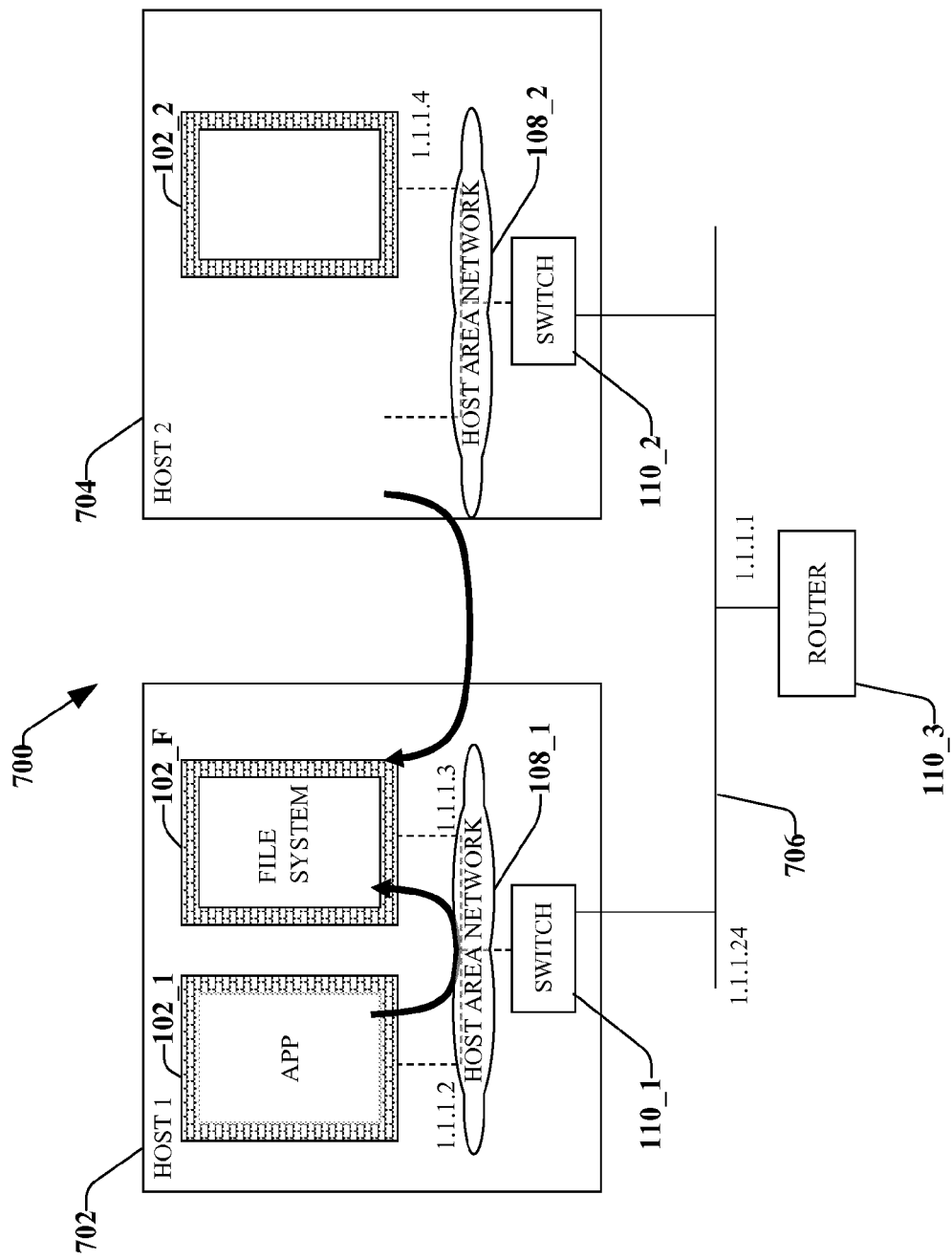
FIG. 7 illustrates an exemplary non-limiting block diagram of a system that facilitates intra-cluster process migration according to various aspects of the disclosed subject matter.

FIG. 7 illustrates an exemplary non-limiting block diagram of a system 700 that facilitates intra-cluster process migration according to various aspects of the disclosed subject matter. As described above with reference to FIGS. 1-6, in various non-limiting embodiments of the disclosed subject matter, system 700 can comprise one or more host systems (e.g., one or more host systems 100), including a number of processes 102 (e.g., including local file system 102_F), each associated with a lightweight network stack 104 (not shown), and with the respective host processes 102 connected via HANs 108. In addition, host system 700 can include gateway 110 (e.g., gateway process 300 including switch and/or router functionality) and network interfaces 112 (not shown). It is to be appreciated that processes 102, lightweight network stack 104 (not shown), HAN 108, gateway 110, and network interfaces 112 (not shown) can each include their respective functionality, as more fully described herein, for example, with regard to host system 100, process 200, gateway process 300, and/or host systems 400-600.

For example, system 700 illustrates host system 1 (702) connected to host system 2 (704) via switches 110_1 and 110_2 and router 110_3 creating system or cluster 700 network segment 706. As described above, the choice of which functionalities are selected for gateway process 110 can depend in part on what protocol support is desired (e.g., to facilitate process mobility between the host systems 100).

In the example of system 700, the choice for gateway process functionality is that functionality typically provided by via router and switch functionality at the HAN 108. Thus it should be understood that a HAN 108_1 of host system 1 (702) and a HAN 108_2 of to host system 2 (704) would typically reside on different subnets (e.g., 1.1.1.24 and 1.1.1.1 respectively). As a result of a process 102_F moving from one host system to the other (e.g., from host system 2 (704) to host system 1 (702)), the IP address of process 102_F would change from one host system in the network (704) to another in the network (702). Accordingly, gateway process 300 or portions thereof, as implemented in router 110_3 can be configured to implement IETF mobile IP, for example, to facilitate this scenario.

Figure 8:
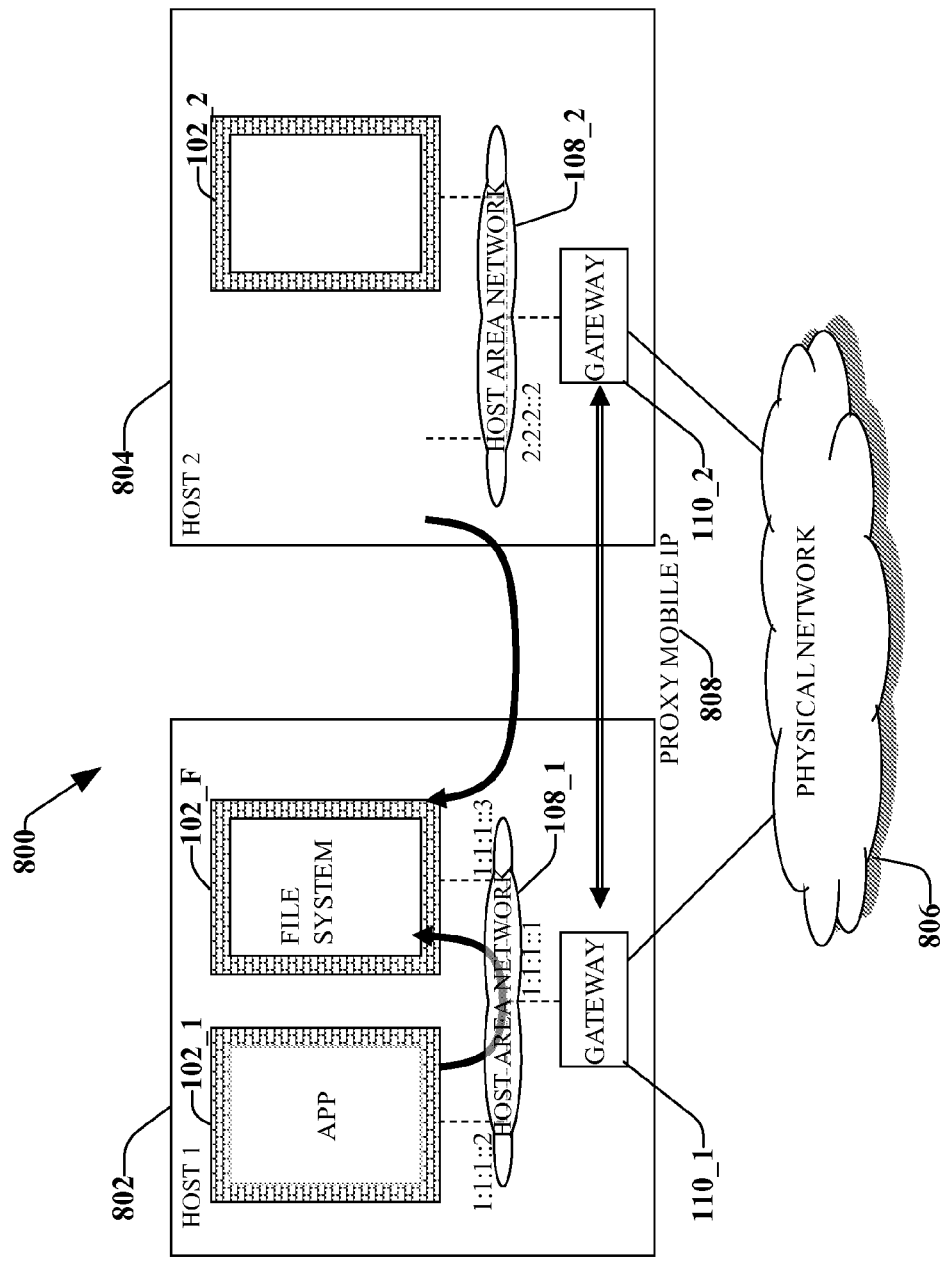
FIG. 8 illustrates an exemplary non-limiting block diagram of a system that facilitates intra-host process migration according to various aspects of the disclosed subject matter.

FIG. 8 illustrates an exemplary non-limiting block diagram of a system 800 that facilitates intra-host process migration according to various aspects of the disclosed subject matter. As described above with reference to FIGS. 1-7, in various non-limiting embodiments of the disclosed subject matter, system 800 can comprise one or more host systems (e.g., one or more host systems 100), including a number of processes 102 (e.g., including local file system 102_F), each associated with a lightweight network stack 104 (not shown), and with the respective host processes 102 connected via HANs 108. In addition, host system 800 can include gateways 110 (e.g., gateway processes 300) and network interfaces 112 (not shown). It is to be appreciated that processes 102, lightweight network stack 104 (not shown), HAN 108, gateway 110, and network interfaces 112 (not shown) can each include their respective functionality, as more fully described herein, for example, with regard to host system 100, process 200, gateway process 300, and/or host systems 400-700. For example, system 800 illustrates host system 1 (802) connected to host system 2 (804) via gateways 110_1 and 110_2 across physical network 806. According to various non-limiting embodiments of the invention, system 800 can facilitate process migration across hosts for example, by gateway processes 300, as implemented in gateways 110 configured to implement mobile IP as a proxy for the file system process 102_F.

Figure 9:
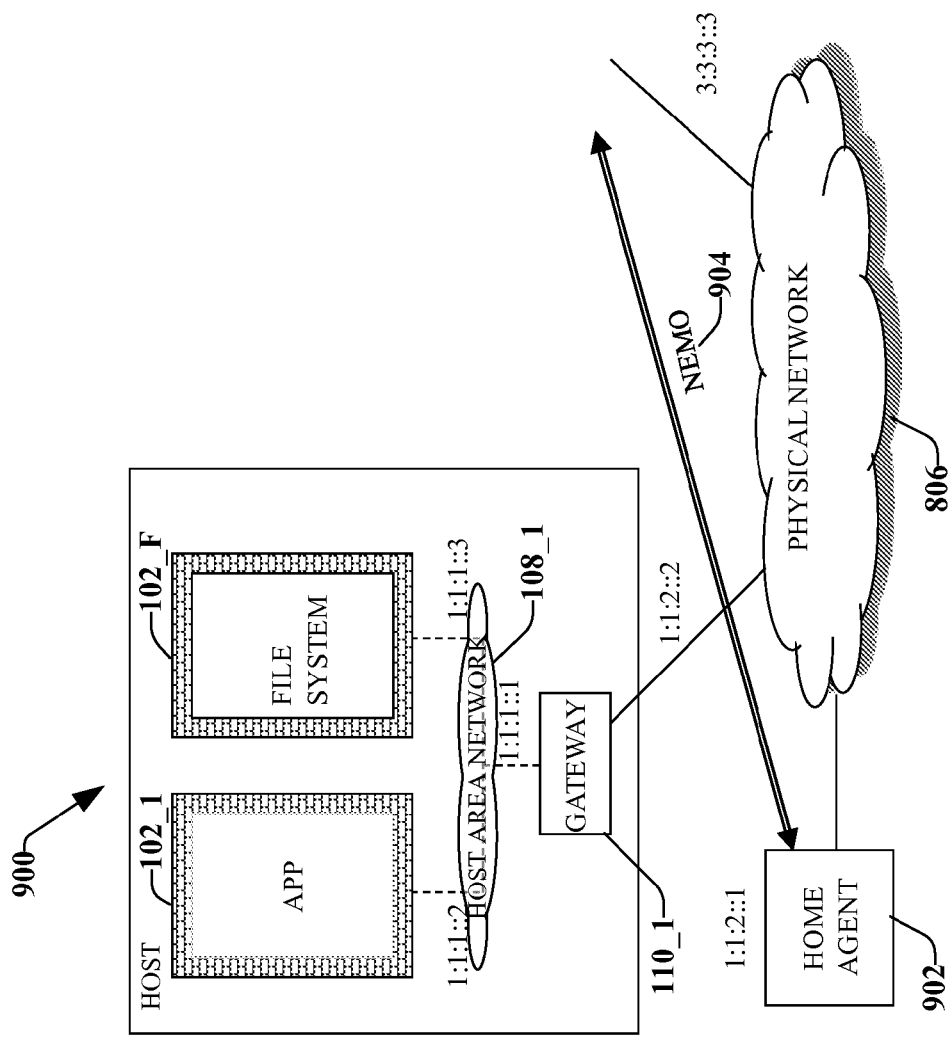
FIG. 9 illustrates a further non-limiting block diagram of a system that facilitates host mobility according to various aspects of the disclosed subject matter.

FIG. 9 illustrates a further non-limiting block diagram of a system 900 that facilitates host mobility according to various aspects of the disclosed subject matter. As described above with reference to FIGS. 1-8, in various non-limiting embodiments of the disclosed subject matter, system 900 can comprise a host system (e.g., host system 100), including a number of processes 102 (e.g., including local file system 102_F), each associated with a lightweight network stack 104 (not shown), and with host processes 102 connected via HAN 108. In addition, host system 900 can include a gateway 110 (e.g., gateway process 300) and network interfaces 112 (not shown). It is to be appreciated that processes 102, lightweight network stack 104 (not shown), HAN 108, gateway 110, and network interfaces 112 (not shown) can each include their respective functionality, as more fully described herein, for example, with regard to host system 100, process 200, gateway process 300, and/or host systems 400-800. For example, system 900 illustrates a host system connected physical network 806. According to various non-limiting embodiments of the invention, system 800 can facilitate host migration across physical network 806 via home agent 902 and network mobility protocols (NEMO 904).

Figure 10:
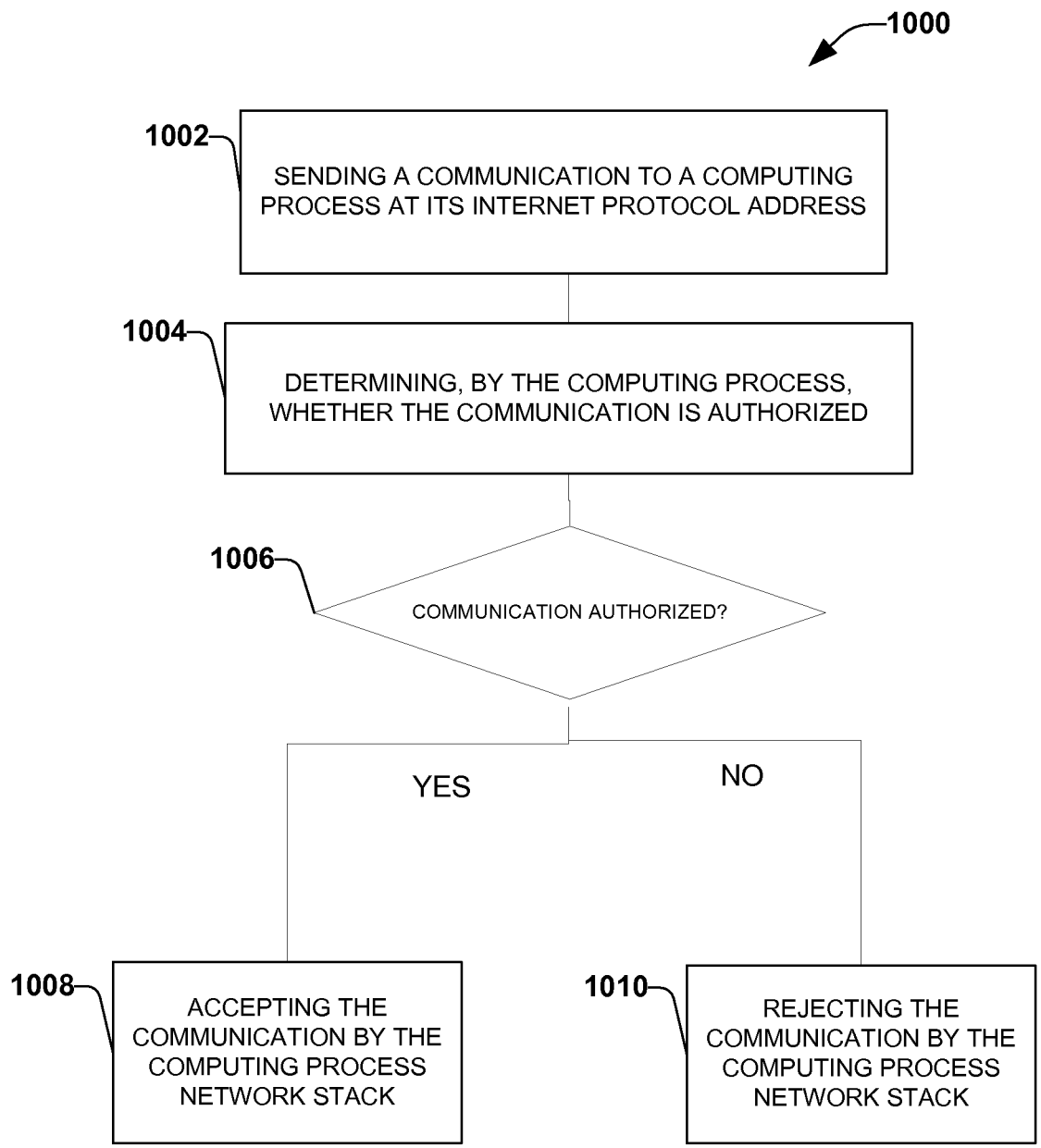
FIG. 10 illustrates a particular non-limiting high level methodology that facilitates inter-process networking according to various aspects of the disclosed subject matter.

FIG. 10 illustrates a particular non-limiting high level methodology 1000 that facilitates inter-process networking according to various aspects of the disclosed subject matter. For example at 1002, a communication such as an inter-process communication can be sent to a computing process at its internet protocol address. At 1004, a determination can be made by the computing process, whether the communication is authorized. If at 1006, it is determined that the computing process is authorized, then at 1008 the computing process network stack can accept the communication. If at 1006, it is determined that the computing process is not authorized, then at 1010 the computing process network stack can reject the communication. For example, accepting or rejecting the communication can be based filtering rules, firewall rules, and/or provision or lack of provision of authentication data, and any combination thereof. In addition, methodology 1000 can further include accessing network resources by the computing process via the computing process network stack (e.g., a remote file system process, a remote networked resource such as a printer, etc.). Additionally, methodology 1000 can further include accessing a second host to process tasks in parallel with the second host.

Exemplary Networked and Distributed Environments

One of ordinary skill in the art can appreciate that the disclosed subject matter can be implemented in connection with any computer or other client or server device, which can be deployed as part of a computer network, or in a distributed computing environment, connected to any kind of data store. In this regard, the disclosed subject matter pertains to any computer system or environment having any number of memory or storage units, and any number of applications and processes occurring across any number of storage units or volumes, which can be used in connection with inter-process networking in accordance with the disclosed subject matter. The disclosed subject matter can apply to an environment with server computers and client computers deployed in a network environment or a distributed computing environment, having remote or local storage. The disclosed subject matter can also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices can have applications, objects or resources that implicate the systems and methods that facilitate inter-process networking of the disclosed subject matter.

Figure 11:
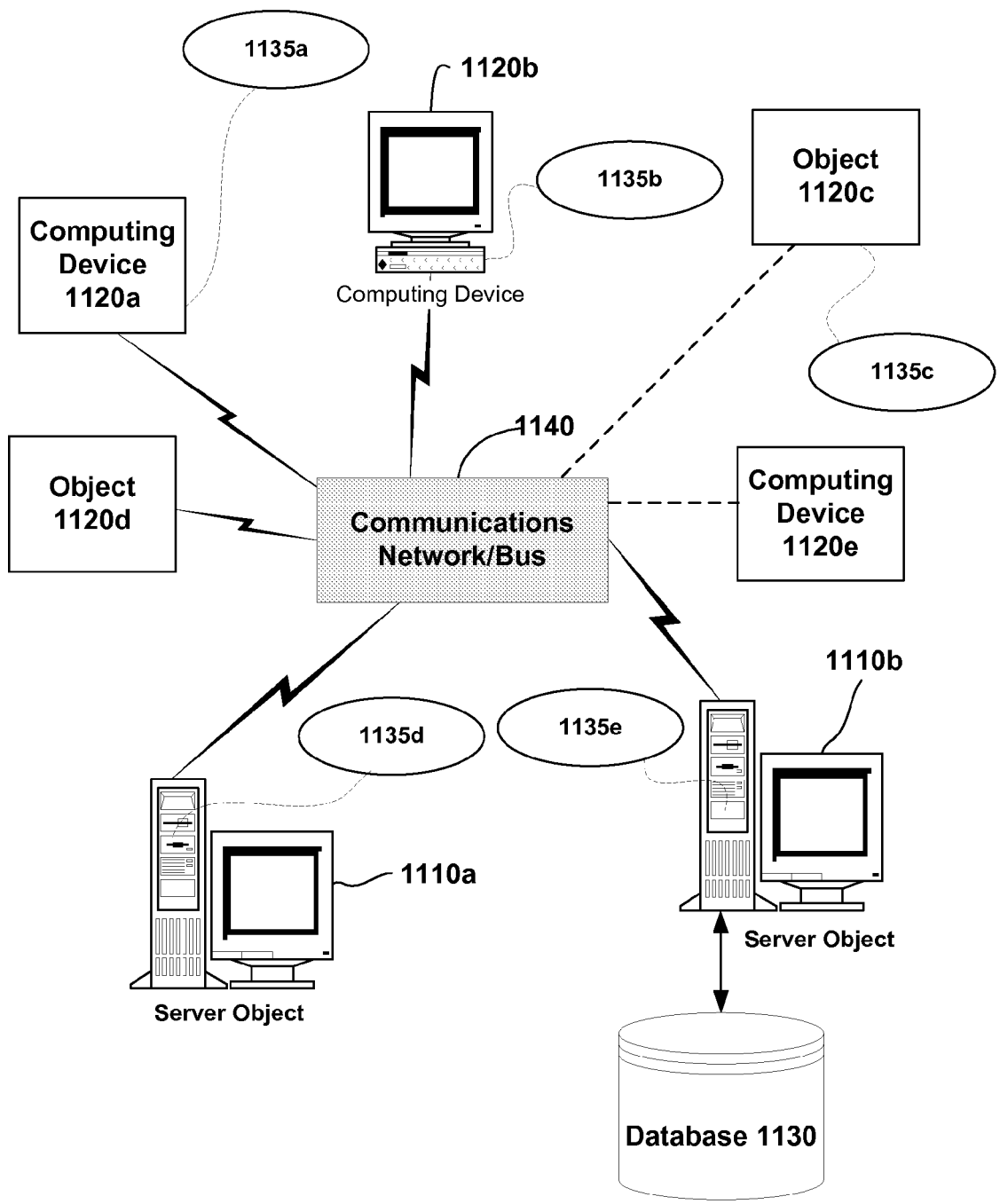
FIG. 11 is a block diagram representing an exemplary non-limiting networked environment in which the disclosed subject matter may be implemented.

FIG. 11 provides a schematic diagram of an exemplary networked or distributed computing environment. The distributed computing environment comprises computing objects 110a, 1110b, etc. and computing objects or devices 1120a, 1120b, 1120c, 1120d, 1120e, etc. These objects can comprise programs, methods, data stores, programmable logic, etc. The objects can comprise portions of the same or different devices such as PDAs, audio/video devices, MP3 players, personal computers, etc. Each object can communicate with another object by way of the communications network 1140. This network can itself comprise other computing objects and computing devices that provide services to the system of FIG. 11, and can itself represent multiple interconnected networks. In accordance with an aspect of the disclosed subject matter, each object 1110a, 1110b, etc. or 1120a, 1120b, 1120c, 1120d, 1120e, etc. may contain an application that might make use of an API, or other object, software, firmware and/or hardware, suitable for use with the systems and methods that facilitate inter-process networking in accordance with the disclosed subject matter.

It can also be appreciated that an object, such as 1120c, can be hosted on another computing device 110a, 1110b, etc. or 1120a, 1120b, 1120c, 1120d, 1120e, etc. Thus, although the physical environment depicted may show the connected devices as computers, such illustration is merely exemplary and the physical environment can alternatively be depicted or described comprising various digital devices such as PDAs, televisions, MP3 players, etc., any of which can employ a variety of wired and wireless services, software objects such as interfaces, COM objects, and the like.

There are a variety of systems, components, and network configurations that support distributed computing environments. For example, computing systems can be connected together by wired or wireless systems, by local networks or widely distributed networks. Currently, many of the networks are coupled to the Internet, which provides an infrastructure for widely distributed computing and encompasses many different networks. Any of the infrastructures can be used for exemplary communications made incident to inter-process networking according to the designs of the disclosed subject matter.

In home networking environments, there are at least four disparate network transport media that can each support a unique protocol, such as Power line, data (both wireless and wired), voice (e.g., telephone) and entertainment media. Most home control devices such as light switches and appliances may use power lines for connectivity. Data Services can enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic can enter the home either as wired (e.g., Cat 3) or wireless (e.g., cell phones) and can be distributed within the home using Cat 3 wiring. Entertainment media, or other graphical data, can enter the home either through satellite or cable and is typically distributed in the home using coaxial cable. IEEE 1294 and DVI are also digital interconnects for clusters of media devices. All of these network environments and others that emerge, or already have emerged, as protocol standards can be interconnected to form a network, such as an intranet, that can be connected to the outside world by way of a wide area network, such as the Internet. In short, a variety of disparate sources exist for the storage and transmission of data, and consequently, any of the computing devices of the disclosed subject matter may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 11, as an example, computers 1120a, 1120b, 1120c, 1120d, 1120e, etc. can be thought of as clients and computers 1110a, 110b, etc. can be thought of as servers where servers 1110a, 1110b, etc. maintain the data that is then replicated to client computers 1120a, 1120b, 1120c, 1120d, 1120e, etc., although any computer can be considered a client, a server, or both, depending on the circumstances. Any of these computing devices can be processing data or requesting services or tasks that implicate the systems and methods that facilitate inter-process networking in accordance with the disclosed subject matter.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques for inter-process networking of the disclosed subject matter can be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) can be coupled to one another via TCP/IP connection(s) for high-capacity communication.

Thus, FIG. 11 illustrates an exemplary networked or distributed environment, with server(s) in communication with client computer (s) via a network/bus, in which the disclosed subject matter can be employed. In more detail, a number of servers 1110a, 1110b, etc. are interconnected via a communications network/bus 1140, which can be a LAN, WAN, intranet, GSM network, the Internet, etc., with a number of client or remote computing devices 1120a, 1120b, 1120c, 1120d, 1120e, etc., such as a portable computer, handheld computer, thin client, networked appliance, or other device, such as a VCR, TV, oven, light, heater and the like in accordance with the disclosed subject matter. It is thus contemplated that the disclosed subject matter can apply to any computing device in connection with which it is desirable to provide inter-process networking according to embodiments of the disclosed subject matter.

In a network environment in which the communications network/bus 1140 is the Internet, for example, the servers 1110a, 1110b, etc. can be Web servers with which the clients 1120a, 1120b, 1120c, 1120d, 1120e, etc. communicate via any of a number of known protocols such as HTTP. Servers 110a, 110b, etc. can also serve as clients 1120a, 1120b, 1120c, 1120d, 1120e, etc., as can be characteristic of a distributed computing environment.

As mentioned, communications can be wired or wireless, or a combination, where appropriate. Client devices 1120a, 1120*b*, 1120*c*, 1120*d*, 1120*e*, etc. may or may not communicate via communications network/bus 14, and can have independent communications associated therewith. For example, in the case of a TV or VCR, there may or may not be a networked aspect to the control thereof. Each client computer 1120*a*, 1120*b*, 1120*c*, 1120*d*, 1120*e*, etc. and server computer 1110*a*, 1110*b*, etc. can be equipped with various application program modules or objects 1135*a*, 1135*b*, 1135*c*, etc. and with connections or access to various types of storage elements or objects, across which files or data streams can be stored or to which portion(s) of files or data streams can be downloaded, transmitted or migrated. Any one or more of computers 1110*a*, 1110*b*, 1120*a*, 1120*b*, 1120*c*, 1120*d*, 1120*e*, etc. can be responsible for the maintenance and updating of a database 1130 or other storage element, such as a database or memory 1130 for storing data processed or saved according to the disclosed subject matter. Thus, the disclosed subject matter can be utilized in a computer network environment having client computers 1120*a*, 1120*b*, 1120*c*, 1120*d*, 1120*e*, etc. that can access and interact with a computer network/bus 1140 and server computers 1110*a*, 1110*b*, etc. that can interact with client computers 1120*a*, 1120*b*, 1120*c*, 1120*d*, 1120*e*, etc. and other like devices, and databases 1130.

Exemplary Computing Device

Figure 12:
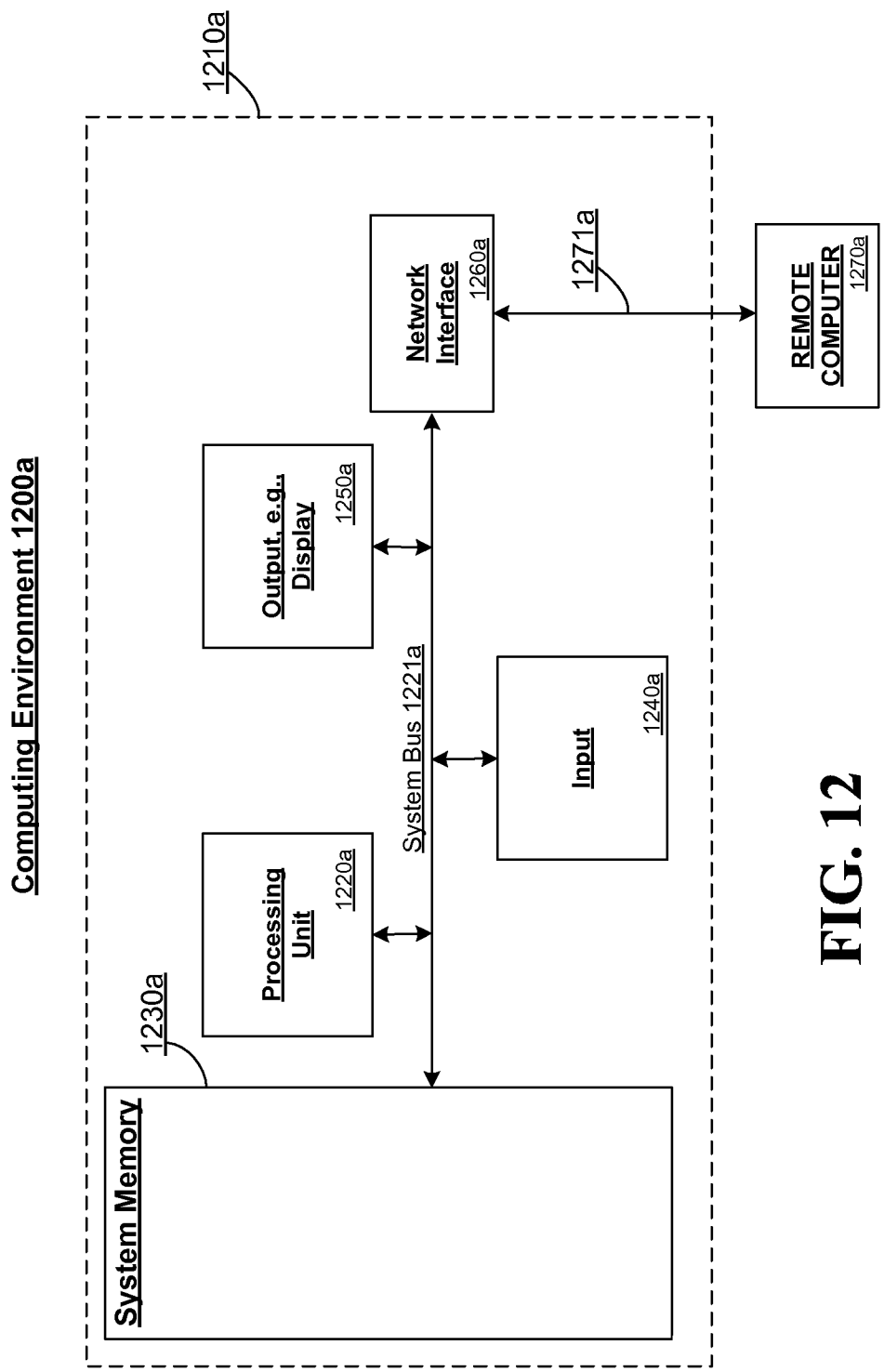
FIG. 12 is a block diagram representing an exemplary non-limiting computing system or operating environment in which the disclosed subject matter may be implemented.

As mentioned, the disclosed subject matter applies to any device wherein it can be desirable to provide inter-process networking. It should be understood, therefore, that handheld, portable and other computing devices and computing objects of all kinds are contemplated for use in connection with the disclosed subject matter, i.e., anywhere that a device can utilize the systems and methods that facilitate inter-process networking or otherwise receive, process or store data. Accordingly, the below general purpose remote computer described below in FIG. 12 is but one example, and embodiments of the disclosed subject matter may be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, the disclosed subject matter can partly be implemented via an operating system, for use by a developer of services for a device or object, and/or included within application software that operates in connection with the component(s) of the disclosed subject matter. Software may be described in the general context of computer executable instructions, such as program modules, being executed by one or more computers, such as client workstations, servers or other devices. Those skilled in the art will appreciate that the disclosed subject matter can be practiced with other computer system configurations and protocols.

FIG. 12 thus illustrates an example of a suitable computing system environment 1200*a* in which the disclosed subject matter can be implemented, although as made clear above, the computing system environment 1200*a* is only one example of a suitable computing environment for a media device and is not intended to suggest any limitation as to the scope of use or functionality of the disclosed subject matter. Neither should the computing environment 1200*a* be interpreted as having any dependency or requirement relating to any one or combination of components illustrated in the exemplary operating environment 1200*a*.

With reference to FIG. 12, an exemplary remote device for implementing the disclosed subject matter includes a general purpose computing device in the form of a computer 1210*a*. Components of computer 1210*a* can include, but are not limited to, a processing unit 1220*a*, a system memory 1230*a*, and a system bus 1221*a* that couples various system components including the system memory to the processing unit 1220*a*. The system bus 1221*a* can be any of several types of bus structures including a memory bus or memory controller, a peripheral bus, and a local bus using any of a variety of bus architectures.

Computer 1210*a* typically includes a variety of computer readable media. Computer readable media can be any available media that can be accessed by computer 1210*a*. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210*a*. Communication media typically embodies computer readable instructions, data structures, program modules or other data in a modulated data signal such as a carrier wave or other transport mechanism and includes any information delivery media.

The system memory 1230*a* can include computer storage media in the form of volatile and/or nonvolatile memory such as read only memory (ROM) and/or random access memory (RAM). A basic input/output system (BIOS), containing the basic routines that help to transfer information between elements within computer 1210*a*, such as during start-up, can be stored in memory 1230*a*. Memory 1230*a* typically also contains data and/or program modules that are immediately accessible to and/or presently being operated on by processing unit 1220*a*. By way of example, and not limitation, memory 1230*a* can also include an operating system, application programs, other program modules, and program data.

The computer 1210*a* can also include other removable/non-removable, volatile/nonvolatile computer storage media. For example, computer 1210*a* could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1221*a* through a non-removable memory interface such as an interface, and a magnetic disk drive or optical disk drive is typically connected to the system bus 1221*a* by a removable memory interface, such as an interface.

A user can enter commands and information into the computer 1210*a* through input devices such as a keyboard and pointing device, commonly referred to as a mouse, trackball or touch pad. Other input devices can include a microphone, joystick, game pad, satellite dish, scanner, or the like. These and other input devices are often connected to the processing unit 1220*a* through user input 1240*a* and associated interface(s) that are coupled to the system bus 1221*a*, but can be connected by other interface and bus structures, such as a parallel port, game port or a universal serial bus (USB). A graphics subsystem can also be connected to the system bus 1221*a*. A monitor or other type of display device is also connected to the system bus 1221*a* via an interface, such as output interface 1250*a*, which can in turn communicate with video memory. In addition to a monitor, computers can also include other peripheral output devices such as speakers and a printer, which can be connected through output interface 1250*a*.

The computer 1210*a* can operate in a networked or distributed environment using logical connections to one or more other remote computers, such as remote computer 1270*a*, which can in turn have media capabilities different from device 1210*a*. The remote computer 1270*a* can be a personal computer, a server, a router, a network PC, a peer device or other common network node, or any other remote media consumption or transmission device, and can include any or all of the elements described above relative to the computer 1210*a*. The logical connections depicted in FIG. 12 include a network 1271*a*, such local area network (LAN) or a wide area network (WAN), but can also include other networks/buses. Such networking environments are commonplace in homes, offices, enterprise-wide computer networks, intranets and the Internet.

When used in a LAN networking environment, the computer 1210*a* is connected to the LAN 1271*a* through a network interface or adapter. When used in a WAN networking environment, the computer 1210*a* typically includes a communications component, such as a modem, or other means for establishing communications over the WAN, such as the Internet. A communications component, such as a modem, which can be internal or external, can be connected to the system bus 1221*a* via the user input interface of input 1240*a*, or other appropriate mechanism. In a networked environment, program modules depicted relative to the computer 1210*a*, or portions thereof, can be stored in a remote memory storage device. It will be appreciated that the network connections shown and described are exemplary and other means of establishing a communications link between the computers can be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the disclosed subject matter can also be implemented via an operating system, or a "middle man" object, a control object, hardware, firmware, intermediate language instructions or objects, etc., such that the systems and methods that facilitate inter-process networking in accordance with the disclosed subject matter can be included in, supported in or accessed via all of the languages and services enabled by managed code, such as .NET code, and in other distributed computing frameworks as well.

There are multiple ways of implementing the disclosed subject matter, e.g., an appropriate API, tool kit, driver code, operating system, control, standalone or downloadable software object, etc. which enables applications and services to utilize inter-process networking and related systems and methods of the disclosed subject matter. The disclosed subject matter contemplates the use of the disclosed subject matter from the standpoint of an API (or other software object), as well as from a software or hardware object that provides inter-process networking in accordance with the disclosed subject matter. Thus, various implementations of the disclosed subject matter described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the disclosed subject matter have been described in connection with various computing devices and network architectures, the underlying concepts can be applied to any computing device or system in which it is desirable to provide inter-process networking. For instance, the systems and methods that facilitate inter-process networking of the disclosed subject matter can be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the disclosed subject matter.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on computer and the computer can be a component. One or more components can reside within a process and/or thread of execution and a component can be localized on one computer and/or distributed between two or more computers.

Thus, the methods and apparatus of the disclosed subject matter, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed subject matter. In the case of program code execution on programmable computers, the computing device generally includes a processor, a storage medium readable by the processor (including volatile and non-volatile memory and/or storage elements), at least one input device, and at least one output device. One or more programs that can implement or utilize the systems and methods that facilitate inter-process networking of the disclosed subject matter, e.g., through the use of a data processing API, reusable controls, or the like, are preferably implemented in a high level procedural or object oriented programming language to communicate with a computer system. However, the program(s) can be implemented in assembly or machine language, if desired. In any case, the language can be a compiled or interpreted language, and combined with hardware implementations.

The methods and apparatus of the disclosed subject matter may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the disclosed subject matter. When implemented on a general-purpose processor, the program code combines with the processor to provide a unique apparatus that operates to invoke the functionality of the disclosed subject matter. Additionally, any storage techniques used in connection with the disclosed subject matter may invariably be a combination of hardware and software.

Furthermore, portions of the disclosed subject matter can be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

In view of the exemplary systems described supra, methodologies that can be implemented in accordance with the disclosed subject matter will be better appreciated with reference to the flowchart of FIG. 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks may be required to implement the methodologies described hereinafter.

Furthermore, as will be appreciated various portions of the disclosed systems and methods can include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the disclosed subject matter has been described in connection with the preferred embodiments of the various figures, it is to be understood that other similar embodiments can be used or modifications and additions can be made to the described embodiment for performing the same function of the disclosed subject matter without deviating therefrom. For example, while exemplary network environments of the disclosed subject matter are described in the context of a networked environment, such as a peer to peer networked environment, one skilled in the art will recognize that the disclosed subject matter is not limited thereto, and that the methods, as described in the present application can apply to any computing device or environment, such as a gaming console, handheld computer, portable computer, etc., whether wired or wireless, and can be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the disclosed subject matter in the context of particular programming language constructs, the disclosed subject matter is not so limited, but rather may be implemented in any suitable language to provide systems that facilitate inter-process networking, and related methods. Still further, the disclosed subject matter can be implemented in or across a plurality of processing chips or devices, and storage can similarly be effected across a plurality of devices. Therefore, the disclosed subject matter should not be limited to any single embodiment, but rather should be construed in breadth and scope in accordance with the appended claims.

What is claimed is:

1. A system comprising:
one or more processors; and
a memory, coupled to the one or more processors, storing:
a gateway process, executing on the one or more processors, that manages a host-area network, the host-area network permitting communications between processes; and
a first process, executing on the one or more processors, comprising:
an internet protocol address;
a network stack that receives a communication from a second process over the host-area network;
an authentication component of the network stack that determines that the communication is authorized and that accepts the communication in response to determining that the communication is authorized; and
a mobility component that moves the first process from a first host to a second host via the gateway process, wherein the first process retains the same internet protocol address subsequent to moving.

2. The system of claim 1, wherein the gateway process comprises another network stack that is more complete than the network stack of the first process.

3. The system of claim 2, wherein the network stack of the first process supports one or more of mobile internet protocol (IP) or network mobility protocol.

4. The system of claim 1, wherein the gateway process manages a plurality of network devices associated with the first host.

5. The system of claim 1, wherein the gateway process comprises one or more of routing functions, gateway functions, switch functions, process mobility functions, parallel computing functions, authentication functions, or bridge functions.

6. The system of claim 1, wherein the authentication component of the first process allows or denies the communication from the second process according to one or more of filtering rules, firewall rules, or provision or lack of provision of authentication data.

7. A method comprising:
sending, via a first host-area network that connects a plurality of processes for a first host, a communication from a first computing process with a first network stack and a first internet protocol address to a second computing process with a second network stack and a second internet protocol address;
determining, by an authentication component of the second network stack, that the communication is authorized;
accepting, by the authentication component of the second network stack, the communication in response to determining that the communication is authorized;
moving the second computing process from the first host to a different host while retaining the same second internet protocol address; and
accessing, subsequent to the moving, network resources associated with the second computing process via the second network stack and the second internet protocol address.

8. The method of claim 7, wherein the determining is based in part on one or more of filtering rules, firewall rules, or provision or lack of provision of authentication data.

9. The method of claim 7, wherein accessing the network resources comprises accessing one or more of a remote file system process or a remote network printer.

10. The method of claim 7, wherein accessing the network resources comprises accessing a second host to parallel process one or more tasks.

11. A computing apparatus for performing the method of claim 7.

12. A system comprising:
one or more processors;
a memory, coupled to the one or more processors, storing a first process, executing on the one or more processors, the first process including:
a lightweight network stack and an internet protocol address that receives inter-process communications via a host-area network;
a firewall component of the lightweight network stack that accepts the inter-process communications based in part on one or more of filtering rules, firewall rules, or authentication data; and
a mobility component of the lightweight network stack that moves the first process from a first host to a second host via a gateway process, wherein the first process retains the same internet protocol address subsequent to moving from the first host to the second host via the gateway process.

13. The system of claim 12, further comprising an authentication component of the lightweight network stack that verifies authenticity of a second process attempting to communicate.

14. The system of claim 12, further comprising a parallelization component of the lightweight network stack that initiates requests for parallel processing of tasks associated with the first process.

15. The system of claim 14, wherein the parallelization component further receives and responds to requests for parallel processing of tasks associated with a second process.

16. The system of claim 12, wherein the first process further moves the first process from a first processor core of the system to another processor core of the system.

17. The system of claim 12, wherein the gateway process manages network devices associated with the system.

* * * * *